Aug. 13, 1957     W. J. DAVIS     2,802,237
FORMATION OF ELONGATED THERMOPLASTIC SHAPES
IN VIBRATORY FORMING TUBE
Filed May 10, 1954
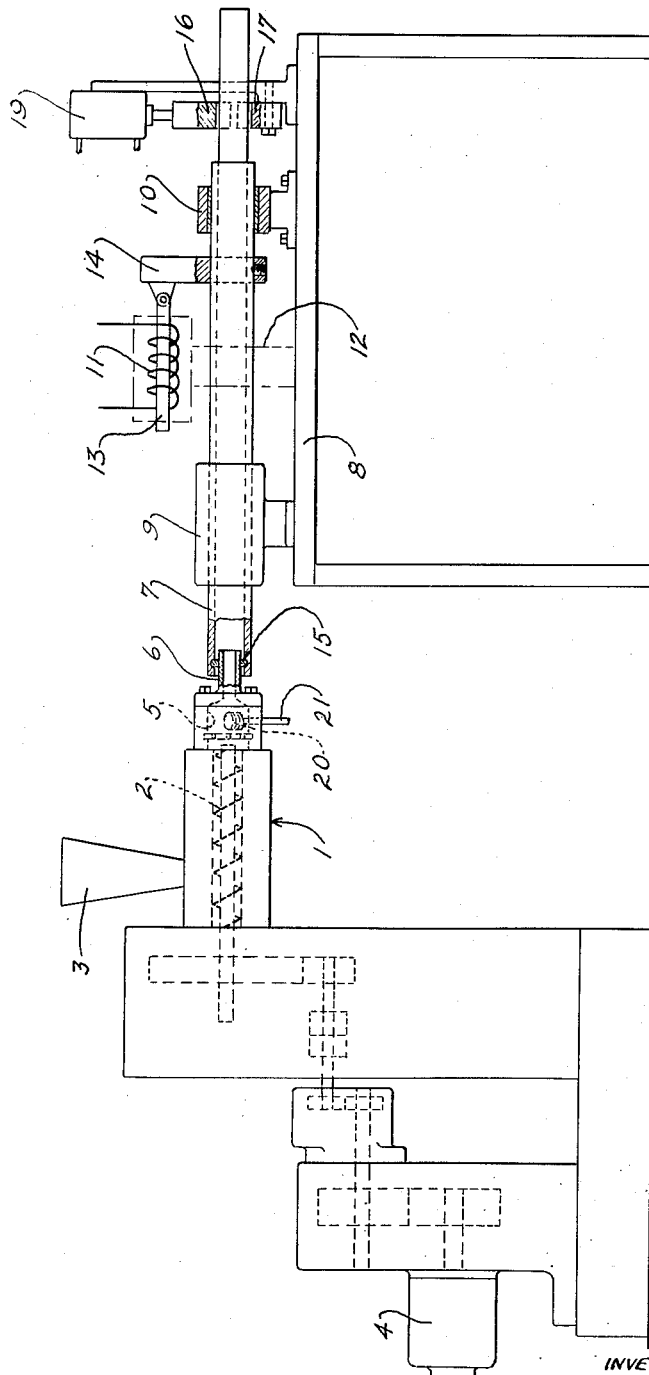
INVENTOR
William J. Davis
ATTORNEYS

2,802,237

FORMATION OF ELONGATED THERMOPLASTIC SHAPES IN VIBRATORY FORMING TUBE

William J. Davis, Reading, Pa., assignor to The Polymer Corporation, Reading, Pa., a corporation of Pennsylvania Application May 10, 1954, Serial No. 428,655

11 Claims. (Cl. 18—12)

This invention relates to the formation of elongated shapes, for instance rod stock, from thermoplastic materials.

More particularly, the invention is concerned with improvements relating to the type of operation and apparatus in which a stream of liquid or substantially liquid thermoplastic material is delivered into the entrance end of an elongated forming tube in which the liquid material is cooled and solidified as it is advanced, and from which the elongated shape being formed is delivered in completely or substantially solidified condition. Apparatus and method of this type is disclosed in copending applications, Serial Nos. 215,339, filed March 13, 1951, now Patent 2,719,330 granted October 4, 1955 and 302,969, filed August 6, 1952, now Patent 2,747,224 granted May 29, 1956, both assigned to the assignee of the present application. As there disclosed the thermoplastic material is fed to the entrance end of the forming tube under pressure by means of a screw feed device. The forming tube is provided with cooling means to effect solidification of the column of plastic material being advanced progressively radially inwardly. The cooling rate, the length of the tube and the rate of feed are arranged to provide for complete or substantially complete solidification of the elongated shape being formed prior to delivery thereof from the discharge end of the forming tube.

One of the problems encountered in a method and apparatus of the kind above referred to arises from the tendency of the solidifying shape to advance in an irregular or non-uniform manner, sometimes sticking within the forming tube and thereby resulting in irregularity in the pressure of the material in the entrance end of the tube and in the region of solidification.

One of the principal objects of the present invention is to improve the regularity and uniformity of the operation and thereby improve the uniformity of the elongated shape being formed.

Briefly, the major objective referred to above is accomplished in accordance with the present invention by imparting relative vibration to the forming tube and the solidifying material therein. This vibration results in rapidly repeated breaking away of the solidifying material from the interior wall of the forming tube, thereby preventing sticking of the solidifying shape within the tube for any appreciable interval of time.

In consequence increased uniformity of operation is provided and in addition the product itself is of more uniform characteristics, especially because the progressive solidification occurs under substantially uniform conditions of pressure, feed and cooling.

While the method of the present invention may be carried out in a variety of ways and with equipment of a variety of types, one embodiment of such equipment has been shown in the accompanying drawing for illustrative purposes.

In the drawing, the single figure is a side elevational view in which some parts are shown in outline, some in vertical section and some diagrammatically.

The embodiment of the equipment shown in the drawing is first described herebelow, and thereafter certain modifications and variations are pointed out.

In the drawing a screw feed device is indicated at 1. This device may be of known type comprising a barrel in which a feed screw 2 is provided. The thermoplastic material, preferably in flake or granular form, is delivered to the feed screw through a funnel 3. The barrel of the screw feed device is equipped with a surrounding heating jacket serving to heat and melt the plastic material as it is advanced by the screw. The feed screw is adapted to be driven by a motor 4 through intervening gearing, clutches, and the like, as disclosed for example in the copending application Serial No. 302,969 above referred to. The melted plastic material is delivered by the screw 2 into a chamber 5 communicating with the delivery or discharge nozzle 6. The forming tube 7 is mounted on a table or other suitable support such as indicated at 8, as by means of the devices indicated at 9 and 10. The device 9 comprises a cooling mechanism adapted for the circulation or confinement of a cooling medium, for instance a water spray, in contact with the exterior surface of the forming tube 7. The device 10 comprises a cylindrical or sleeve support for the tube 7. Both the devices 9 and 10 are arranged to provide freedom for vibratory motion of the forming tube 7 in a direction axially of the forming tube.

In the embodiment of the equipment illustrated in the drawing, vibratory motion is imparted to the forming tube 7 by electromagnetic means comprising a coil 11 fixedly mounted on the base 8 as by means of a support indicated at 12. This device further includes an armature 13 which, upon the passage of an alternating current through the winding 11, will be reciprocated in a direction axially of the forming tube. The armature 13 is connected to a bracket 14 which in turn is fixed to the forming tube itself and serves to communicate the vibration of the armature to the tube.

The entrance end of the forming tube is provided with a joint adapted to accommodate the vibratory motion of the tube with respect to the screw feed device and its nozzle 6. In the embodiment illustrated in the drawing this connection comprises a slip joint including a sealing ring 15, providing freedom for relative axial or telescopic movement of the nozzle 6 and the forming tube 7.

Mounted on the support 8 beyond the delivery end of the forming tube a braking device is provided. In the embodiment illustrated this device comprises a pair of relatively movable friction clamps 16 and 17 which may be provided with notches or rounded recesses adapted to engage the solidified shape 18 beyond the end of the forming tube. The clamps 16 and 17 may be caused to grip the shape 18 under the action of a fluid pressure piston and cylinder device 19.

With equipment of the kind shown in the drawing, the operation includes the feed of the melted thermoplastic material from the nozzle 6 into the entrance end of the forming tube 7. This feed occurs under pressure and the material is thereby advanced through the forming tube. During passage through the tube and solidification of the material cooling takes places progressively radially inwardly, for instance under the influence of the cooling medium delivered to the device 9. During the advancement and solidification of the material in the tube, the tube is longitudinally vibrated by means of the alternating current delivered to the winding 11, causing the armature 13 to vibrate and communicate this vibration through the bracket 14 to the tube. Assuming delivery of 60 cycle current to the winding 11, the vibrations will of course be of the same frequency and these vibrations, communicated to the forming tube, rapidly and repeatedly cause the solidifying material to break away from the interior wall of the tube.

The frequency of the current delivered to the winding 11 will determine the rate of vibration of the tube and for this purpose a wide range of frequencies may be used, even extending into the supersonic or radio frequency range. Currents of frequencies appreciably higher than 60 cycles per second are preferred for some purposes, depending upon the size or form of the elongated shape being formed, the particular kind of plastic being used, and other factors. Selection of currents of different amplitude or power may be desirable depending upon certain variables such as those mentioned just above.

With the vibratory action above described, the resistance to advancement of the thermoplastic material through the tube is greatly diminished and it is therefore contemplated that a braking mechanism as above described be employed to engage the solidified shape beyond the delivery end of the forming tube and thereby provide a substantially uniform braking action against which the pressure may be built up and maintained at a uniform value in the region of solidification, to thereby provide for solidification under uniform pressure conditions.

The invention is particularly useful with certain thermoplastic materials having relatively sharp melting points. In this case, the material is delivered from the screw feed device as a liquid. With this type of material a change from the liquid to the solid phase occurs in the cooling or solidifying region of the forming tube and this presents a special problem from the standpoint of maintenance of uniformity of feed and pressure in the region of solidification. Examples of this type of material (having relatively sharp melting points) are the so-called high melting synthetic linear polyamides, notably, polyhexamethylene adipamide, polyhexamethylene sebacamide, and polymerized epsilon aminocaproic acid (polycaprolactam). With the improvement of the present invention uniformity of operation and of the product is made possible when employing the high melting polyamides even without resort to formation of tube 7 of special materials or to the employment of a special lining within the tube in an effort to reduce the sticking. Thus, with the improvement of the present invention, the forming tube 7 may simply comprise a low carbon steel tube.

The arrangement of the present invention as above described may further be used in combination with certain pressure control features disclosed in the copending application Serial No. 302,969 above referred to, for which purpose a pressure responsive device 20 is desirably located within the chamber 5 at the delivery end of the screw feed device. This pressure responsive device is coupled as by fluid pressure line 21 with control mechanism for the drive motor 4 or for a clutch in the drive system between the motor and the screw, as is disclosed in said copending application.

Although in the embodiment illustrated in the drawing, the winding 11 of the electromagnetic vibrating device is associated with an armature 13, which armature is connected with the forming tube 7, the winding of this device may surround or be directly associated with the tube 7 itself, in which event it is contemplated that the tube be formed of ferro-magnetic material.

With respect to the relative vibration of the tube and the material for the purposes above described, it is pointed out that the vibration need not necessarily be limited to movement in the axial direction of the tube, but may be in a plane transverse to the axis of the tube, for instance by vibratory change in the cross-sectional dimension or shape of the tube, in which event the supports or mounting devices associated with the tube would be re-arranged to accommodate transverse rather than longitudinal vibration of the tube.

From the standpoint of the broader aspect of the method herein contemplated, vibration of the tube in any one or more of a variety of directions or senses will suffice, the important consideration being to provide the relative vibration between the tube and the solidfying material therein, so as to repeatedly and rapidly break the bond between the solidifying material and the tube wall. Indeed the vibration may even prevent the formation of a bond between the polyamide material and the tube by cavitation or the like.

Having in mind the consideration just above it will further be seen that a variety of means may be employed for initiating or imparting the vibratory motion to the tube.

The method and equipment of the invention are effective in the production of round rods in a wide range of sizes and also in the production of tubes, flat bars, hexagons, etc.

I claim:

1. A method for continuously forming an elongated shape from high melting polyamide materials, which method comprises continuously feeding the polyamide material under pressure into one end of an open-ended forming tube and advancing the material through the tube under the influence of the feed pressure, cooling the material during advancement through the tube to provide for continuous delivery from the tube of a substantially solidified shape, and effecting relative vibration of the tube and the solidifying material therein to provide against sticking of the solidifying material to the interior wall of the tube.

2. A method according to claim 1 in which the relative vibration of the tube and the solidifying material therein is effected in a direction lengthwise of the tube.

3. A method according to claim 1 and further including applying a braking force to the solidified shape beyond the delivery end of the forming tube.

4. A method for continuously forming an elongated shape from high melting polyamide materials, which method comprises continuously feeding the polyamide material under pressure into one end of an open-ended forming tube and advancing the material through the tube under the influence of the feed pressure, cooling the material during advancement through the tube to provide for continuous delivery from the tube of a substantially solidified shape, and electromagnetically vibrating the tube to provide against sticking of the solidified material to the interior wall of the tube.

5. A method according to claim 4 in which the tube is electromagnetically vibrated in an axial direction.

6. Apparatus for forming an elongated shape from thermoplastic material, comprising an elongated forming tube, a device for feeding a stream of thermoplastic under pressure into one end of the forming tube to be cooled and solidified therein and delivered from the opposite end of the tube in substantially solidified condition, and mechanism for effecting relative vibration of the tube and the solidifying material therein.

7. Apparatus according to claim 6 and further including braking means engaging the solidified shape beyond the end of the forming tube and acting to resist advancement of the solidified shape from the tube.

8. Apparatus for forming an elongated shape from thermoplastic material, comprising an elongated forming tube, a device for feeding a stream of thermoplastic material under pressure, said device having a discharge nozzle for delivery of the thermoplastic material into one end of the forming tube, means mounting the forming tube with freedom for vibration, mechanism for effecting vibration of the tube, and a pressure tight connection between the tube and said nozzle accommodating vibratory motion of the tube with respect to the nozzle while providing for delivery of thermoplastic material from the nozzle into the tube under pressure.

9. Apparatus for forming an elongated shape from thermoplastic material, comprising an elongated forming tube, a device having a discharge nozzle for delivery of a stream of thermoplastic material under pressure into one end of the forming tube to be cooled and solidified therein and delivered from the opposite end of the tube in substantially solidified condition, means mounting the forming tube with freedom for vibratory motion longitudinally thereof, a pressure tight slip joint between said nozzle and the tube accommodating vibratory motion of the tube with respect to the nozzle while providing for delivery of the thermoplastic material from the nozzle into the tube, and mechanism for effecting longitudinal vibration of the tube.

10. In equipment for forming an elongated shape from thermoplastic material by introduction of heated thermoplastic material under pressure into one end of the tube, cooling and solidifying the material as it advances through the tube, and delivering the substantially solidified shape from the other end of the tube, a device for feeding a stream of heated thermoplastic material under pressure into one end of the tube, a braking device for engaging the solidified shape beyond the other end of the tube, said devices being mounted in spaced but relatively fixed relationship, the intervening tube being mounted for vibratory motion independently of said feeding and braking devices, and mechanism for effecting vibration of the tube.

11. Equipment according to claim 10 in which the tube is mounted with freedom for vibratory motion in a direction axially thereof and in which the mechanism for vibrating the tube comprises an electromagnetic vibrator associated therewith.

References Cited in the file of this patent
UNITED STATES PATENTS

| | | |
|---|---|---|
| 1,545,376 | Weatherby | July 7, 1925 |
| 1,985,899 | Jahn | Jan. 1, 1935 |
| 2,118,182 | Flint | May 24, 1938 |
| 2,365,375 | Bailey et al. | Dec. 19, 1944 |
| 2,597,553 | Weber | May 20, 1952 |
| 2,661,499 | James et al. | Dec. 9, 1953 |